3,221,028
PREPARATION OF β-LACTONES
Ronald G. Nations and Robert H. Hasek, Kingsport, Tenn., assignors to Eastman Kodak Company, Rochester, N.Y., a corporation of New Jersey
No Drawing. Filed May 2, 1963, Ser. No. 277,474
10 Claims. (Cl. 260—343.9)

This invention relates to a method for the preparation of β-lactones and more particularly to the preparation of β-lactones by reaction of dialkylketenes with aldehyde polymers in the presence of a Lewis acid catalyst.

The process is illustrated by the following reaction:

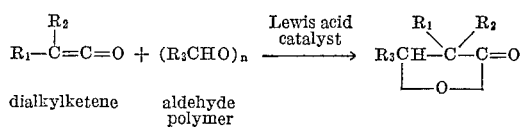

wherein $R_1$ and $R_2$ are the same or different lower alkyl groups of 1 to 4 carbon atoms such as methyl, ethyl, propyl, isopropyl and butyl, or $R_1$ and $R_2$ together with the carbon atoms to which they are attached form a saturated carbocyclic ring of 5 to 6 carbon atoms, e.g. pentamethylene and hexamethylene, $R_3$ is hydrogen or a lower alkyl group and $n$ is a positive integer greater than 2 and represents the degree of polymerization of the aldehyde.

The preparation of β-lactones by reaction of ketenes with aldehydes using Friedel-Crafts-type catalysts is known as shown by Staudinger, Ann., 384, 38–135 (1911); Küng, U.S. Patent 2,356,459; Steadman, U.S. Patents 2,424,589 and 2,424,590, and other patents. These references primarily describe the preparation of β-propiolactone by reaction of ketene with monomeric aldehydes such as gaseous formaldehyde obtained by thermal decomposition of paraformaldehyde. The prior art has considered that the aldehyde cannot be generated within the reaction mixture as disclosed by Young et al. in U.S. Patent 2,580,714, who state that the aldehyde polymers paraformaldehyde, paraldehyde, etc. are not reactive towards ketene. Similarly, Küng, ibid, avoids use of excess formaldehyde for reaction with ketene and states that it "leads to its polymerization," whereas, in the present invention polymerized aldehydes, including polymerized formaldehyde, are employed, preferably in excess. This inactivity of aldehyde polymers with ketenes is aptly illustrated in Example 1 hereinafter.

We have discovered, surprisingly, that if dialkylketenes are used in the reaction illustrated above, in place of ketene, the reaction with aldehyde polymers proceeds readily to the production of β-lactones in high yield. In fact, the reaction may become exothermic depending upon the particular reactants used as described below. In general, the reaction is carried out by preparing a solution or slurry of the aldehyde polymer and Lewis acid catalyst, such as zinc chloride, if desired in substantially inert organic solvent, and adding the dialkylketene. An excess of the aldehyde polymer is preferred to avoid formation of excessive amounts of dialkylketene dimers. As described in the examples below, depending upon the particular ketenes and aldehyde polymer used, it may be desirable to initially heat the reaction mixture, although as mentioned in some cases illustrated by Examples 2 and 4, the reaction may become exothermic and require cooling. Thus, the temperature range for the reaction can vary widely and generally is from −10° C. to 100° C. Below 20° C. the reaction may be rather slow and above 90–100° C. undesirable side reactions may occur. Accordingly, a useful temperature range of operation is 20° to 100° C., preferably 25° to 70° C.

Organic solvents used in the reaction are those relatively inert to the reactants and include hydrocarbons, ethers, esters, ketones and nitriles, e.g., diethyl ether, tetrahydrofuran, tetrahydropyran, diisopropyl ether, ethylene dichloride, dioxane, benzene, toluene, xylenes, ethylbenzene, chlorobenzene, acetonitrile, ethyl acetate, isopropyl acetate, isobutyl acetate, methyl isobutyrate, di(2-ethylhexyl)phthalate, acetone, methyl isoamyl ketone, and the like. The β-lactones produced by the process are excellent solvents, and may be employed with the advantage of eliminating the need for handling quantities of other solvents.

The β-lactones can be isolated from the reaction mixtures by a variety of methods, but in general distillation under reduced pressure is used at temperatures below the point of decomposition to suppress polymerization. Inhibitors can be added to the reaction for this purpose. Likewise, the catalyst can be neutralized by known methods prior to distillation.

The aldehyde polymers used for reaction with dialkylketenes are those well known in the art having the formula $(R_3CHO)_n$ described above, where $n$ can be an integer from 3 to several hundred.

For example, the cyclic formaldehyde trimer trioxane, the cyclic acetaldehyde trimer paraldehyde, cyclic tetramers and pentamers as well as noncyclic aldehyde polymers such as paraformaldehyde (polyoxymethylene), are useful in the process.

As indicated above, the catalyst for the reaction is a Lewis acid. As defined by G. N. Lewis ["Valence and the Structure of Atoms and Molecules," Chemical Catalogue Co., N.Y., 1923; J. Franklin Inst. 226, 243 (1938)] an acid is a substance that can accept a pair of electrons from another substance to form a chemical bond. Lewis' broad definition includes substances that are proton donors, such as hydrochloric acid, and substances that accept electrons but do not furnish protons, for instance, boron trifluoride. Acids that donate protons are designated as protonic. Those that merely accept electrons but do not donate protons are called aprotonic.

The latter type of acids is referred to in this specification as an "aprotonic Lewis acid" or simply as a "Lewis acid." We use these terms to distinguish from the protonic acids or so-called Brönsted acids. Only aprotonic Lewis acids are suitable in the method of the invention. Protonic acids are unsuitable.

A large number of the described aprotonic acids of the Lewis type as used in the method of the invention are available. They include such materials as boron trifluoride, silicon tetrachloride, phosphorous pentoxide, sulfur dioxide, aluminum chloride, antimony pentachloride, mercuric chloride, ferric chloride, stannic chloride, boron trifluoride, titanium tetrachloride, zinc bromide, zinc chloride, etc. The well-known Friedel-Crafts catalysts, a number of which are mentioned, comprise a class of aprotonic Lewis acids that are particularly valuable as catalysts in the method of our invention. The amount of catalyst can be varied between wide limits, e.g., 0.01 to 10 g. per mole of reactants, preferably 0.1 to 1.0 g. per mole of reactants.

The dialkylketenes having the formula:

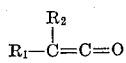

defined above are used, e.g., dimethylketene, ethylmethylketene, diethylketene, methylpropylketene, isobutylethylketene, butylethylketene, pentamethyleneketene and hexamethyleneketene.

The β-lactones prepared according to the invention are particularly useful as intermediates for the preparation of esters, acids and halides as described in U.S. Patents 2,422,728, 2,352,641, 2,526,557, 2,449,987, 2,548,161 and for ether esters as in U.S. 2,449,447 etc.

The following examples will serve to illustrate our invention.

Example 1.—Attempted reaction of ketene with paraformaldehyde

A mixture of 100 g. of paraformaldehyde, 2 g. of zinc chloride and 160 ml. of toluene (dried over sodium) was placed in a flask under a Dewar-type cold trap filled with acetone and Dry Ice. Ketene was bubbled into the stirred mixture at the rate of 70 g. per hr. at 50° C. for one hour. The mixture was cooled and filtered. The filtrate was distilled at 15–20° C. and 2 mm. pressure and the distillate was received in a trap cooled by Dry Ice and acetone. Infrared spectra and vapor phase chromatographic data showed that the distillate contained no detectable amounts of β-propiolactone.

Example 2

To an agitated slurry of 100 g. of paraformaldehyde, 1 g. of mercuric chloride and 200 ml. of dry isopropyl acetate was added portionwise 220 g. of dimethylketene in 200 ml. of isopropyl acetate. The stirred mixture was heated during the addition to 50–55° C. and the exothermic reaction was held at this temperature by the occasional use of an ice bath. After the yellow color of the ketene had disappeared, the mixture was filtered and flash distilled through a 2″ laboratory model Rodney-Hunt Vacu-Film Processor. A crude solution (295 g.) of pivalolactone was received, which was fractionated through an efficient column to give 270 g. (84% of theory) of refined pivalolactone, B.P. 50–51° C. (12 mm.), $n_D^{20}$ 1.4092.

Example 3

In the manner described in Example 2, a solution of 260 g. of ethylmethylketene was added to an identical isopropyl acetate slurry of paraformaldehyde, with 1 g. of zinc chloride as catalyst. After purification, 250 g. of 2-ethyl-2-methyl-β-propiolactone was obtained, representing a yield of 72%.

Example 4

A mixture of 92 g. of paraformaldehyde, 0.5 g. of zinc chloride and 300 g. of diethylketene was slowly heated to 40° C. A violently exothermic reaction took place to give 2,2-diethyl-β-propiolactone.

Example 5

A mixture of 300 g. of methylpropylketene and 1 g. of zinc chloride was heated to 40° C., and 92 g. of paraformaldehyde was added in small portions during 1 hour. The product was a mixture of methylpropylketene dimer and 2-methyl-2-propyl-β-propriolactone.

Example 6

A mixture of 41 g. of paraldehyde and 93 g. of diethylketene containing 0.5 g. of zinc chloride was allowed to stand at 25° C. for 2 hours, and then was heated to 90° C. for 30 mintues. Distillation gave 2,2-diethyl-β-butyrolactone, B.P. 76° C. (4.9 mm.), $n_D^{20}$ 1.4350.

Example 7

A mixture of 300 g. of methylpropylketene, 1 g. of zinc chloride and 140 g. of paraldehyde was stirred at 30–35° C. for 4 hours. At the end of this time, the yellow ketene color had disappeared. Distillation gave 2-methyl-2-propyl-β-butyrolactone, B.P. 51–52° C. (1 mm.), $n_D^{20}$ 1.4354.

Example 8

To a stirred mixture of 100 ml. of benzene, 0.1 g. of zinc chloride and 25 g. of paraformaldehyde was added 85 g. of crude butylethylketene. The mixture was heated at 50° for 2 hours and then at 80° for 12 hours. The reaction mixture was filtered and distilled to give 52 g. (49.5% yield) of 2-butyl-2-ethyl-β-propiolactone, B.P. 61° C. (1 mm.), $n_D^{20}$ 1.4364.

Example 9

To a mixture of 50 g. of paraformaldehyde and 2 ml. of boron trifluoride-etherate complex in 200 ml. of tetrahydrofuran was added 180 g. of pentamethyleneketene. The mixture was refluxed for 6 hours. After removal of the solvent, distillation at reduced pressure gave the β-lactone of 1-hydroxymethylcyclohexanecarboxylic acid.

The invention has been described in considerable detail with particular reference to certain preferred embodiments thereof, but it will be understood that variations and modifications can be effected within the spirit and scope of the invention as described hereinabove, and as defined in the appended claims.

The embodiments of the invention in which an exclusive property or privilege is claimed are described as follows:

1. A process of preparing a β-lactone which comprises contacting with a catalytic amount of an aprotonic Lewis acid a mixture of
   (1) a disubstituted ketene having the general formula

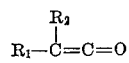

wherein R and $R_1$ are selected from the class consisting of lower alkyl and alkylene groups which, together with the carbon atom to which they are attached form a saturated carbocyclic ring of 5 to 6 carbon atoms, and
   (2) an aldehyde polymer having the general formula

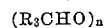

wherein $R_3$ represents a member of the class consisting of hydrogen and lower alkyl, and $n$ is a positive integer greater than 2.

2. A process of preparing a β-lactone which comprises contacting with a catalytic amount of an aprotonic Lewis acid a mixture of a lower dialkylketene and paraformaldehyde.

3. A process of preparing a β-lactone which comprises contacting with a catalytic amount of an aprotonic Lewis acid a mixture of a lower dialkylketene and paraldehyde.

4. A process of preparing a β-lactone which comprises preparing a reaction mixture of a lower dialkylketene and paraformaldehyde and a catalytic amount of an aprotonic Lewis acid, maintaining the reaction mixture at about 20 to 100° C. and distilling the resultant β-lactone from the reaction mixture.

5. A process which comprises preparing a reaction mixture of paraformaldehyde, dimethylketene, and a catalytic amount of an aprotonic Lewis acid, maintaining the reaction mixture at about 20 to 100° C. and distilling the resultant pivalolactone from the reaction mixture.

6. A process which comprises preparing a reaction mixture of paraformaldehyde, diethylketene, and a catalytic amount of an aprotonic Lewis acid, maintaining the reaction mixture at about 20 to 100° C. and distilling the resultant 2,2-diethyl-β-propiolactone from the reaction mixture.

7. A process which comprises preparing a reaction mixture of paraldehyde, diethylketene, and a catalytic amount of an aprotonic Lewis acid, maintaining the reaction mixture at about 20 to 100° C. and distilling the resultant 2,2-diethyl-β-butyrolactone from the reaction mixture.

8. A process which comprises preparing a reaction mixture of paraformaldehyde, butylethylketene and a catalytic amount of an aprotonic Lewis acid, maintaining the reaction mixture at about 20 to 100° C. and distilling the resultant 2-butyl-2-ethyl-β-propiolactone from the reaction mixture.

9. The process of claim 1 wherein the Lewis acid is mercuric chloride.

10. The process of claim 1 wherein the Lewis acid is zinc chloride.

References Cited by the Examiner

FOREIGN PATENTS 654,235   6/1951   Great Britain.

WALTER A. MODANCE, *Primary Examiner.*

NICHOLAS S. RIZZO, *Examiner.*